J. W. JOHNSON & G. W. HOOVER.
BRAKE MECHANISM.
APPLICATION FILED JUNE 13, 1916.
1,225,965.
Patented May 15, 1917.
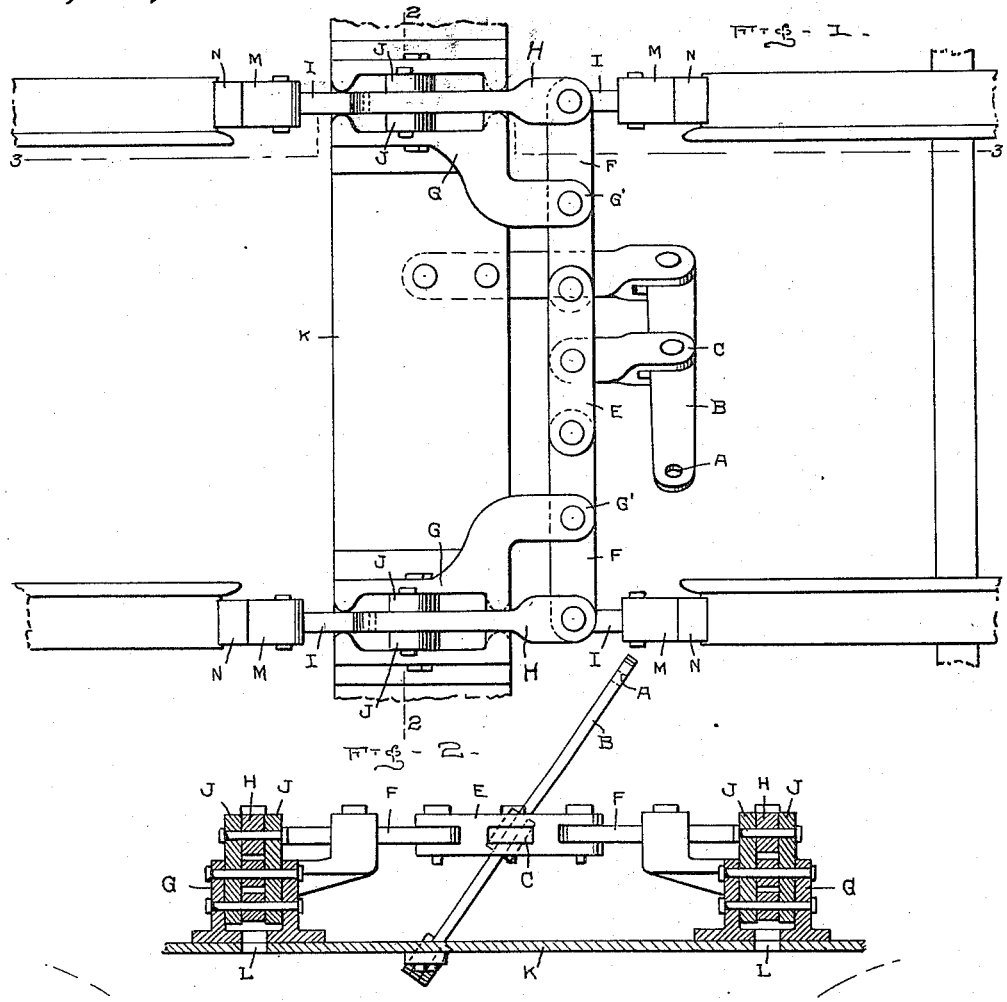
Inventors
J. W. Johnson and G. W. Hoover
By W. J. Fitzgerald & Co.
Attorneys

UNITED STATES PATENT OFFICE.

JOHN W. JOHNSON AND GEORGE W. HOOVER, OF WAPELLA, ILLINOIS.

BRAKE MECHANISM.

1,225,965.	Specification of Letters Patent.	Patented May 15, 1917.

Application filed June 13, 1916. Serial No. 103,518.

*To all whom it may concern:*

Be it known that we, JOHN W. JOHNSON and GEORGE W. HOOVER, citizens of the United States, residing at Wapella, in the county of Dewitt and State of Illinois, have invented certain new and useful Improvements in Brake Mechanisms; and we do hereby declare the following to be a full, clear, and exact description of the invention, such as will enable others skilled in the art to which it appertains to make and use the same.

Our invention relates to new and useful improvements in brake mechanism and particularly applicable for use in connection with railway, street car and similar trucks, and our object is to provide a brake that can be applied to use in connection with the usual, or any preferred form of truck.

A further object is to provide means for quickly and positively clamping the brake shoes in connection with the wheels of the truck.

And a further object is to so construct the brake mechanism as to dispense with the usual form of brake beams and operating rods which tend to cause wrecks.

Other objects and advantages will be hereinafter set forth and more particularly pointed out in the accompanying specification.

In the accompanying drawings which are made a part of this application,

Figure 1 is a detail top plan view of the brake mechanism.

Fig. 2 is a transverse vertical sectional view as seen on line 2—2 of Fig. 1, and Fig. 3 is a sectional elevation taken on the line 3—3 of Fig. 1.

Referring to the drawings in which similar reference characters designate corresponding parts throughout the several views K indicates a part of the usual form of truck, commonly called the sandboard, upon which is mounted brackets G, said brackets having channels therethrough through which extend bars I for attachment with the brake shoes M, the outer ends of the bars I being pivotally attached to the brake shoes, while the inner ends thereof are pivotally attached to links J, the pivot point of one bar being in a plane above the pivot point of the inner end of the other bar, and in order to hold the link and inner ends of the bars in proper alinement, the pivot pins attaching the bars to the links are extended beyond each side of the links and into curved slots Q formed in the walls of the brackets G.

The upper ends of the links J are pivoted to thrust bars H, said thrust bars having openings R therethrough so that the thrust bars may be adjusted with respect to the links. The forward ends of the thrust bars H are bifurcated to receive the ends of levers F, said levers being extended at right angles to the trend of the thrust bars H and have their inner ends pivotally attached to the ends of a head block E, the levers F being pivotally attached to arms G' carried by the brackets G to form a fulcrum point for the levers.

Pivotally attached to the head block E and preferably at its longitudinal center, is a coupling C, the outer end of the coupling being attached to a lever B substantially at the longitudinal center of said lever, the upper end of said lever having an opening A for the reception of any preferred form of rod or chain employed for operating the lever, while the lower end of the lever is pivotally secured to a bracket D carried by the sandboard K.

The brake shoes M are provided with any suitable form of wear plates N and said brake shoes are suspended from parts of the truck, preferably by means of links O, thus always retaining the shoes and wear plates in position to readily grip the surface of the truck wheels. In setting the brakes, a pull is given to the lever B to swing the same toward the head block E, thereby moving said head block inwardly and rocking the levers F upon their pivots and moving thrust bars H outwardly, this operation rocking the links J and causing the bars I to move the brake shoes into engagement with the face of the truck wheels, the force of the frictional engagement of said shoes with the wheels depending entirely upon the force of the pull given the lever B.

By constructing the parts of the brake mechanism in the manner shown and mounting the same upon the sandboard of the truck, there are no parts to drop down and engage with the trackway as is true of the brake mechanism now generally in use, thus avoiding any possibility of wrecks, due to the parts dropping upon the track way.

It will likewise be seen that this form of brake mechanism may be very cheaply constructed and readily applied to use and as all of the parts are constructed of metal, the mechanism will be durable and substantial.

It is noted that each of the brackets G and the sand board K are provided with longitudinal slots L to permit any dirt or foreign matter which may be deposited upon the adjacent parts to pass freely through and on to the ground.

We claim:—

1. A brake mechanism, comprising the combination with parts of a truck, of brackets carried by said parts of the truck, said brackets having channels, arms projecting from the brackets, links mounted in the channels in the brackets, bars pivoted to said links, brake shoes carried by the bars, means to suspend the brake shoes, thrust bars adjustably attached to the upper ends of said links, levers pivoted to the arms of the brackets and to one end of each thrust bar, a head block pivoted to the inner ends of said levers, a pivotally mounted lever connected to said head block and adapted to move the same inwardly or outwardly to operate the brake shoes.

2. In a brake mechanism, the combination with parts of a truck, of brackets mounted upon parts of the truck, said brackets having channels, the walls of said brackets having curved slots, links extending vertically into the channels of the brackets, a pair of thrust bars for each link, pivot pins for securing the inner ends of the bars to the links, the ends of said pivot pins entering said slots, brake shoes pivotally attached to the outer ends of said bars, means to suspend said brake shoes from parts of the truck, a thrust bar adjustably attached to the upper end of each link, an operating lever pivotally attached to the outer end of each thrust bar, an arm on each bracket to which said levers are pivotally attached, a head block pivotally connecting said levers, and means to apply pressure to said head block for operating the brake shoes.

In testimony whereof we have signed our names to this specification in the presence of two subscribing witnesses.

JOHN W. JOHNSON.
GEORGE W. HOOVER.

Witnesses:
O. E. MOUSER,
E. L. HICKMAN.

Copies of this patent may be obtained for five cents each, by addressing the "Commissioner of Patents, Washington, D. C."